United States Patent [19]

Servel et al.

[11] Patent Number: 4,980,885
[45] Date of Patent: Dec. 25, 1990

[54] POWER CONSUMPTION REDUCING DEVICE FOR CYCLIC OPERATING EQUIPMENT SUCH AS A TIME-DIVISION SWITCHER

[75] Inventors: Michel Servel; Pierre Boyer, both of Lannion; Jean-Paul Quinquis, Perros-Guirec, all of France

[73] Assignee: Etat Francais Represente Par le Ministre Des Postes, Telecommunications Et De l'Espace (Center National D'Etudes Des Telecommunications), Issy-les-Moulineaux, France

[21] Appl. No.: 336,495

[22] Filed: Apr. 11, 1989

[30] Foreign Application Priority Data

Apr. 15, 1988 [FR] France .................. 88 05032

[51] Int. Cl.$^5$ .................................. H04J 3/26
[52] U.S. Cl. .................................. 370/60; 370/61; 377/20
[58] Field of Search ............ 370/58.1, 60, 61, 79, 370/94.1, 119; 377/20; 328/129–131; 307/600, 602, 608; 455/343

[56] References Cited

U.S. PATENT DOCUMENTS 4,745,629  5/1988  Essig et al. .................. 377/20

Primary Examiner—Douglas W. Olms
Assistant Examiner—Melvin Marcelo
Attorney, Agent, or Firm—Lowe, Price, LeBlanc, Becker & Shur

[57] ABSTRACT

A device embodying the invention for a packet time-division switcher comprises essentially a circuit for detecting beginnings and ends of load interruption periods in the switcher, and a period counter. The detecting circuit is connected to a plurality of input buffer quenes of the switcher and detects a load interruption when all queues signal a state of packet emptiness. A time base of the switcher is inhibited at the end of a period of predetermined duration established by the counter and following the detection of a load interruption. Said duration is predetermined so as to complete the switching of a packet that has been begun. Once the time base is inhibited, the operating of the switcher is interrupted and its power consumption becomes very low. The time base is freed as soon as a packet is received by the queues, and the switcher resumes operating.

5 Claims, 1 Drawing Sheet

POWER CONSUMPTION REDUCING DEVICE FOR CYCLIC OPERATING EQUIPMENT SUCH AS A TIME-DIVISION SWITCHER

BACKGROUND OF THE INVENTION

FIELD OF THE INVENTION

This invention relates to the reduction of power consumed by electronic equipment in general. More specifically, this invention relates to the reduction of power consumed by electronic equipment operating in cycles controlled by a time base and in which power consumption can be reduced by inhibiting the time base during periods of load interruption. Such an equipment includes e.g. asynhcronous packet time-division switchers using MOS (Metal Oxyde Semiconductor) type technology.

MOS or CMOS technology is more and more widely used for electronic circuits of all types. Indeed, a circuit using MOS technology has the advantage of very low power consumption. The power consumption of a logic circuit using MOS technology is substantially proportional to the number of logic level transitions carried out in the circuit, and is negligible when the circuit is unused, i.e. in the absence of level transitions. For electronic equipment operating in cycles and using MOS technology, such as e.g. multiplexors, demultiplexors and time-division switchers, a method for reduction of their power consumption comprises inhibiting their cyclic operating during periods of load interruption, i.e. periods during which the equipment has no data signals to process, so as not to foster useless and power consuming level transitions.

OBJECT OF THE INVENTION

The main object of this invention is to provide a power consumption reducing device for electronic equipment, operating according to the above-mentioned method.

Another object of this invention is to provide such a power consumption reducing device for packet time-division switchers.

SUMMARY OF THE INVENTION

Accordingly, a device embodying the invention for reducing the power consumption of equipment operating in cycles controlled by a time base and having periods of load interruption therein comprises means connected to said equipment for detecting the beginning and end of load interruption periods of the equipment, means connected to said detecting means for inhibiting said time base by suppression of a clock signal supplied at the time base at the end of a period of predetermined duration following the beginning of a detected period of load interruption, and means connected to said detecting means for freeing the time base by restitution of the clock signal to the time base in response to the end of a detected period of load interruption.

In a device embodying the invention designed for a packet time division switcher in which I incoming time-division multiplexes, whereby I is an integer equal to at least 1, are respectively connected to I input buffer queues and issue packets to be temporarily stored in said queues while waiting to be switched by said switcher, the duration of the predetermined duration period, at the end of which the time base is inhibited, is at least equal to the maximum period of time required by the switcher to switch a packet, and the detecting means are connected to each of the I queues and detect the beginning and the end of a load interruption period according to I queue filling signalization signals which are respectively issued by the I queues and which each indicate filling stages, empty and full, of the corresponding queue.

BRIEF DESCRIPTION OF THE DRAWING

The foregoing and other objects, features and advantages of the invention will be apparent from the following detailed description of several embodiments of the invention with reference to the corresponding accompanying drawing in which is shown a power consumption reducing device embodying the invention associated with an asynchronous packet time-division switcher.

DESCRIPTION OF THE PREFERRED EMBODIMENTS

Figure 1:
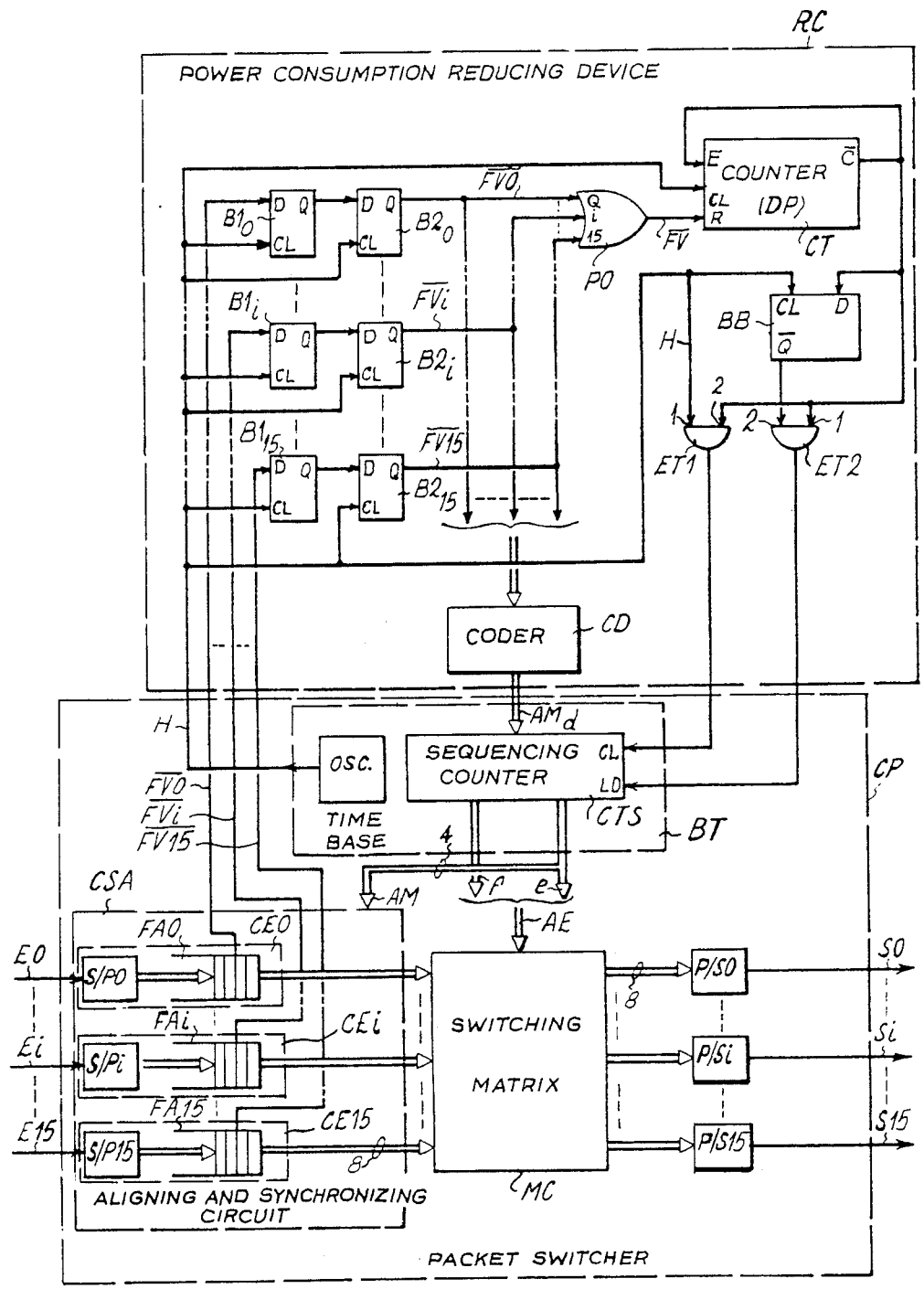

Referring to the FIGURE an asynchronous time-division packet switcher CP comprises a power consumption reducing device RC.

The packet switcher CP comprises e.g. I=16 incoming time-division multiplexes E0 to E15 and I=16 outgoing time-division multiplexes S0 to S15. The incoming multiplexes E0 to E15 are connected to a packet aligning and synchronizing circuit CSA in the switcher CP. The circuit CSA comprises I=16 identical input circuits CE0 to CE15 respectively associated to the incoming multiplexes E0 to E15. An input circuit CEi, whereby i is a whole index between 0 and I-1=15, is essentially comprised of a serial-parallel converter S/Pi and an alignment buffer queue FAi. The converter S/Pi receives, in the form of serial bits, asynchronous incoming packets issued by the multiplex Ei and each including a predetermined number of octets. The converter S/Pi supplies the packets output in the form of octets in series. The packet octets issued by the converter S/Pi are memorized in chronological order of arrival in the alignment queue FAi. The purpose of the queues FA0 to FA15 is to offset the time gaps caused by the asynchronism of the packets. In each alignment queue FAi, an output connected to the device RC issues a queue filling signalization signal $\overline{FV}i$ having a logic state "0" when the queue FAi is empty, i.e. when it does not contain any packet, and having a logic state "1" when the queue FA. is not empty, i.e. when it contains at least one packet.

The queues FA0 to FA15 cyclically transfer the packet octets towards I=16 input ports of a packet switching matrix MC of the switcher CP. The transfers of the octets delivered by the alignment queues FA0 to FA15 towards the matrix MC are controlled by a time base BT of the switcher CP which also controls the packet switching operations carried out in the matrix MC. To do so, the time base BT cyclically issues I=16 multiplex selection addresses AM="0000" to AM="111" in a 4-wire sequencing bus e connected to the synchronizing and aligning circuit CSA and to the switching matrix MC. The addresses AM are supplied by four less significant outputs of the time base BT corresponding respectively to 4 less significant outputs of a sequencing counter CTS included in the time base BT. The time base BT also issues, via most significant outputs connected to a bus f, address complements which are added to the multiplex addresses AM to form write addresses AE issued at a buffer memory (not represented) of the switching matrix MC in which the packets being switched are temporarily stored. The switching matrix MC issues outgoing packets, octet by octet, by I=16 output ports connected to I=16 outgoing multiplexes S0 to S15 respectively via I=16 serial-parallel converters P/S0 to P/S15.

The power consumption reducing device RC comprises I=16 latch couples in cascade $B1_0$, $B2_0$ to $B1_{15}$, $B2_{15}$, an OR-gate with I=16 inputs PO, a binary counter CT, two AND-gates with 2 inputs each ET1 and ET2, a latch BB and a coder CD.

The time base BT of the switcher CP comprises an oscillator OSC which issues a clock signal H whose frequency F determines an octet transfer rhythm in the switcher CP. The signal H is applied at clock inputs CL of the latch couples $B1_0$, $B2_0$, to $B1_{15}$, $B2_{15}$, of the latch BB and the counter CT, and at a first input 1 of the gate ET1.

The latch couples $B1_0$, $B2_0$, to $B1_{15}$, $B2_{15}$ are respectively connected to the alignment queues FA0 to FA15 and their purpose is to synchronously detect, in raising edges of signal H, "empty queue" states of the queues FA0 to FA15. A secondary purpose of the latch couples $B1_0$, $B2_0$, to $B1_{15}$, $B2_{15}$ is to ensure a filtering by sampling at frequency F of the signals $\overline{FV0}$ to $\overline{FV15}$ so as to eliminate any interference in these signals. The signals $\overline{FV0}$ to $\overline{FV15}$ are respectively applied at data inputs D of the latches $B1_0$ to $B1_{15}$. Outputs Q of the latches $B1_0$ to $B1_{15}$ are respectively connected to data inputs D of the latches $B2_0$ to $B2_{15}$. Outputs Q of the latches $B2_0$ to $B2_{15}$ respectively issue the synchronized signals $\overline{FV0}$ to $\overline{FV15}$ at I=16 inputs 0 to 15 of the gate PO and at I=16 inputs of the coder CD. An output of the gate PO is connected to a resetting input R of the counter CT and supplies at the input R a signal $\overline{FV}$ which is in the state "0" when all the alignment queues FA0 to FA15 are empty and which is otherwise in the state "1".

The counter CT is a binary counter whose purpose is to produce a period of predetermined duration DP. The capacity N of the counter CT is determined according to the frequency F of the signal H and to the Period DP. The period DP is planned to be at least equal to the maximum period of time required by the switcher CP to switch an incoming packet in the matrix MC between any incoming multiplex and at least any one outgoing multiplex, i.e. equal to the maximum period of time between the writing and the reading of a packet in the matrix MC. After resetting by the signal $\overline{FV}$="1", then disposal of the latter, the counter CT is incremented to the rhythm of the signal H applied to the input CL. At the end of the period DP=N/F, the counter CT reaches a maximum capacity N and overflows. The overflowing of the counter CT is signalled by a ( transition to the state "0" of an overflow output $\overline{C}$ of the counter CT. The output $\overline{C}$ is looped on a counting validation input E of the counter which, in the state "1", authorizes a counting of the clock impulses H in the counter CT. When the counter CT reaches maximum capacity N, it is inhibited by the transition of the output $\overline{C}$ towards the state "0".

The output $\overline{C}$ of the counter CT is also connected to a data input D of the latch BB, to a second input 2 of the gate ET1, and to a first input 1 of the gate ET2. A second input 2 of the gate ET2 is connected to a complementary output Q of the latch BB. Outputs of the gates ET1 and ET2 are respectively connected to a clock input CL and to a control input LD of the sequencing counter CTS in the time base BT.

As long as at least one of the alignment queues FA0 to FA15 is not empty and contains one or more packets not yet transferred towards the switching matrix MC, the signal $\overline{FV}$ issued by the gate PO is in the state "1" and the counter CT is kept initialized to zero. The output $\overline{C}$ of the counter CT is in the state "1", the gate ET1 is open and the signal H is applied to the clock input CL of the sequencing counter CTS and controls the incrementation of the addresses AM supplied by the latter. The switcher CP operates normally in a cyclical manner. When the alignment queues FA0 to FA15 are all empty following the transfer of a last incoming packet of a queue FAi towards the matrix MC, the signal $\overline{FV}$ comes into state "0" and frees the counter CT which is then incremented by the signal H. when the counter CT reaches its maximum capacity N, the period DP=N/F has expired since the transfer of said last packet towards the matrix MC and the latter has finished switching it towards at least one of the outgoing multiplexes S0 to S15. The output $\overline{C}$ of the counter CT comes into the state "0", frees the counter CT and closes the gate ET1. The sequencing counter CTS no longer receives the clock signal H and is inhibited after the last address AE supplied. The operating of the counter CT is interrupted, i.e. in load interruption. No more signal transitions take place in the switcher CP and its power consumption is very low.

The state "0" of the output $\overline{C}$ of the counter CT is written in the latch BB, and the complementary output Q of the latch BB supplies a state "1" which opens the gate ET2. After that, when one or more new incoming packets are received in the alignment queues FA0 to FA15, the signal $\overline{FV}$ comes back into the state "1" and initializes and inhibits the counter CT at zero. The output $\overline{C}$ of the counter CT switches to the state "1" and this state "1" is applied via the open gate ET2 to the control input LD of the sequencing counter CTS. A 4-bit restarting multiplex address $AM_d$ issued by the coder CD is applied at data inputs of the sequencing counter CTS and is loaded into 4 less significant latches of the counter CTS so as to be supplied by the sequencing bus e. At the same time, the gate ET1 is also opened by the state "1" at the output $\overline{C}$ of the counter CT and the clock signal H is again supplied to the sequencing counter CTS which restarts from the address $AM_d$. The switcher CP resumes operating.

The coder CD elaborates the address $AM_d$ according to the states of the synchronized signals $\overline{FV0}$ to $\overline{FV15}$ issued by the latches $B2_0$ to $B2_{15}$. The coder CD comprises an internal priority management logic which enables it to elaborate the address $AM_d$ while taking into account the different priorities respectively assigned to the incoming multiplexes E0 to E15. In the case e.g. that after an operating stoppage of the switcher CP, new incoming packets are received in the queues FA1 and FA3, and that a higher priority than that assigned to the multiplex E3 is assigned to the multiplex E1. The coder CD then receives at input the signals $\overline{FV0}$="0", $\overline{FV1}$="1", $\overline{FV2}$="0", $\overline{FV3}$="1", $\overline{FV4}$="0" . . . $\overline{FV15}$="0", and issues at output the address $AM_d$="0001" corresponding to the higher priority multiplex E1 which emitted packets. The address $AM=AM_d$="0001" is loaded on restarting in the sequencing counter CTS and is issued in the bus e. This address $AM_d$ issued in the bus e selects the queue FA1 and invites it to transfer a first incoming packet towards the switching matrix MC. The queues FA2, FA3 ... etc ... are then selected in turn to transfer packets as the counter CTS increments are carried out.

According to a simplified embodiment of the invention, the coder CD as well as the latch BB and the gate ET2 are suppressed. In this simplified embodiment, the sequencing counter CTS resumes its counting, on restarting, from the address at which it was inhibited.

What we claim is:

1. A device for reducing the power consumption of cyclically operating equipment controlled by a time base and having periods of load interruption, said device comprising means connected to said equipment for detecting the beginning and end of load interruption periods of said equipment, means connected to said detecting means for inhibiting said time base by suppression of a clock signal supplied to said time base at the end of a period of predetermined duration following the beginning of a detected period of load interruption, and means connected to said detecting means for freeing said time base by restitution of said clock signal to said time base in response to the end of a detected period of load interruption.

2. The device as claimed in claim 1, wherein said equipment is a packet time-division switcher in which I incoming time-division multiplex ways, where I is an integer equal to at least 1, are respectively connected to I input buffer queues and carry packets to be temporarily stored in said queues while waiting to be switched by said switcher, in which the duration of said predetermined duration period, at the end of which said time base is inhibited, is at least equal to a maximum period of time required by said switcher to switch a packet, and in which said detecting means are connected to each of said I queues and detect said beginning and end of a load interruption period as a function of I queue filling signalization signals which are respectively provided by said I queues and which each indicate empty and full filling states of the respective one of said I queues.

3. The device as claimed in claim 2, wherein said inhibiting means comprise a counter to determine said end of said predetermined duration period by counting of a set number of impulses of said clock signal, said counting being activated by said detecting means as soon as all said signalization signals are in said empty filling state.

4. The device as claimed in claim 2, wherein said detecting means comprises latch means for synchronizing and filtering said I signalization signals by sampling at the frequency of said clock signal.

5. The device as claimed in claim 2, wherein said freeing means comprise means for initializing said time base at a set state that is defined as a function of states of said signalization signals detected by said detecting means and of priorities assigned to said queues so that said switcher starts when said time base is freed by switching a first packet stored in the not-empty queue with the highest ranking priority.

* * * * *